United States Patent [19]

Kitahama et al.

[11] Patent Number: 5,738,571
[45] Date of Patent: Apr. 14, 1998

[54] APPARATUS AND METHOD FOR FORMING RIBS ON A BELT/BELT SLEEVE

[75] Inventors: Koji Kitahama, Hyogo; Yuji Okiyoshi, Komaki; Masahiko Kawashima, Hyogo; Shinji Aono; Osamu Miyajima, both of Komaki, all of Japan

[73] Assignee: Mitsuboshi Belting Ltd., Kobe, Japan

[21] Appl. No.: 746,584

[22] Filed: Nov. 12, 1996

Related U.S. Application Data

[63] Continuation of Ser. No. 302,124, Sep. 7, 1994, abandoned.

[30] Foreign Application Priority Data

Sep. 9, 1993 [JP] Japan .................. 5-249777

[51] Int. Cl.⁶ .................................................. B24B 19/11
[52] U.S. Cl. ....................................... 451/188; 451/51
[58] Field of Search ............................... 451/188, 189, 451/246, 242, 51

[56] References Cited

U.S. PATENT DOCUMENTS

| | | |
|---|---|---|
| 3,565,984 | 2/1971 | Sauer .......................... 264/160 |
| 3,891,405 | 6/1975 | Huber ......................... 451/246 |
| 4,322,916 | 4/1982 | Richmond .................... 451/188 |
| 4,329,192 | 5/1982 | White, Jr. et al. ........... 451/242 |
| 5,335,456 | 8/1994 | Mishima ...................... 451/21 |
| 5,399,116 | 3/1995 | Ellis et al. ................... 451/545 |
| 5,414,963 | 5/1995 | Watanabe et al. ............ 451/72 |

FOREIGN PATENT DOCUMENTS

| | | |
|---|---|---|
| 533505 | 3/1993 | European Pat. Off. |
| 338873 | 10/1989 | France. |
| 535302 | 4/1993 | Germany. |

*Primary Examiner*—Robert A. Rose
*Attorney, Agent, or Firm*—Wood, Phillips, VanSanten, Clark & Mortimer

[57] ABSTRACT

An apparatus and method for forming at least one of a rib and groove on a surface of a power transmission belt/belt sleeve. The apparatus has first and second supports on which the belt/belt sleeve can be mounted for movement in an endless path. First structure is provided on at least one of the first and second supports for reinforcing a belt/belt sleeve, mounted on the first and second supports, against movement and deformation of the belt/belt sleeve relative to the at least one of the first and second supports transversely to the endless path as the belt/belt sleeve moves in the endless path.

21 Claims, 3 Drawing Sheets

APPARATUS AND METHOD FOR FORMING RIBS ON A BELT/BELT SLEEVE

This application is a continuation of application Ser. No. 08/302,124, filed Sep. 7, 1994 now abandoned.

BACKGROUND OF THE INVENTION

1. Field of the Invention

This invention relates to power transmission belts/belt sleeves and, more particularly, to a method of forming at least one of a rib and groove on one or both of the inside and outside belt/belt sleeve surfaces and, in the latter case, for maintaining precise lateral alignment between the ribs and grooves on the inside and outside surfaces of the belt/belt sleeve. The invention is also directed to an apparatus for carrying out the above method.

2. Background Art

In Examined Japanese Patent Publication No. 52-17552, one known method of manufacturing a V-ribbed belt is disclosed. An outer canvas layer, an outer rubber layer, a tension resistant layer, and an inner rubber layer are sequentially laminated, one against the other, around a mandrel to define a belt sleeve. The sleeve is then vulcanized. A grinding wheel, having alternating projections and recesses that are complementary to a desired rib and groove configuration on the belt sleeve, is pressed against the exposed inner rubber layer on the mandrel to form alternating ribs and grooves on the sleeve.

In another known method, which has been recently practiced, a belt sleeve is trained around spaced supports. One of the supports is driven to advance the belt sleeve in an endless path. The belt sleeve is driven in an inside out orientation to expose the inside belt layer. A grinding wheel with diamond abrasive on the peripheral surface thereof is pressed against the moving belt sleeve to define the alternating ribs and grooves on the belt sleeve.

It is also known to construct a "double-rib" belt having laterally spaced, longitudinally extending driving/driven ribs on both the inside and outside surfaces of the belt.

In one conventional method for manufacturing a double-rib belt, a belt sleeve is trained around spaced supports. One of the supports has an element which is driven to advance the belt sleeve in an endless path. A rotary grinding wheel, as described above, is pressed against one of the inside and outside surfaces of the belt sleeve to define alternating ribs and grooves thereon. The belt sleeve is then removed from the supports, turned inside out and re-mounted on the supports. Using the same grinding wheel, the other of the inside and outside surfaces of the belt sleeve is engaged to form alternating ribs and grooves matching those on the first formed surface.

To avoid "mis-pitch", it is important to maintain the lateral alignment of the ribs and grooves on the inside and outside surfaces of the belt sleeve. To maintain a desired lateral alignment between the belt sleeve and grinding wheel, it is known to use a guide roll to abut the moving belt sleeve between the supports. Alternatively, the support with the driven element can be slightly tilted so that the belt sleeve thereon tends consistently towards a position wherein it is aligned as desired with the grinding wheel.

Problems nonetheless persist with the above system. One of these problems is attributable to the loss of lateral rigidity and rigidity between the inside and outside of the belt by reason of the initial formation of one of the inside and outside sleeve surfaces with the grinding wheel.

A prior art system as described above is shown in FIG. 6 herein. A belt sleeve 10 is trained around a rotatable support 12 and at least one other rotatable support (not shown) spaced from the support 12.

The belt sleeve 10 has an inside surface 14 and an outside surface 16. Laterally spaced ribs 18 are defined on the inside surface by a rotary cutting/grinding element 20, in the form of a rotary/cylindrical drum. The cutting/grinding element 20 has projections 22 and recesses 24, alternating along the width of the cutting/grinding element 20 and complementary to the ribs 18 and grooves 26 between adjacent ribs 18.

Initially, the outside belt sleeve surface 16 is placed against the peripheral surface 28 of the support 12, whereupon the cutting/grinding element 20 is pressed thereagainst to form the ribs 18 on the inner surface 14. The belt sleeve 10 is then removed from the supports 12, turned inside out, and replaced on the supports 12 so that the formed surface 14 abuts to the support surface 28. The cutting/grinding element 20 is then pressed against the outside surface 16 of the belt sleeve 10 to define ribs 18' and grooves 26' therebetween.

It is desirable to have the pitch of the ribs 18, 18' and grooves 26, 26' the same on the inside and outside of the belt sleeve 10. However, the formation of the ribs 18 in the first step thins the belt and reduces its lateral rigidity as well as its resistance to a thrusting force from the cutting/grinding element 20 in a direction between the inside and outside surfaces thereof. As the cutting/grinding element 20 is advanced against the thinned belt sleeve 10, the belt sleeve 10 may deform, resulting in a discrepancy in the rib pitch on the inside and outside of the belt sleeve 10. The effect of this is shown in FIG. 6, wherein there is a lateral discrepancy D between the alignment of the grooves 26, 26' on the inside and outside of the belt sleeve 10.

With a double-rib belt, this discrepancy, identified as "mis-pitch", may result in early crack generation in a belt at the misaligned recesses 26, 26'. This "mis-pitch" condition may also cause the belt to jump out of a cooperating pulley.

SUMMARY OF THE INVENTION

It is one objective of the present invention to minimize the discrepancy between the lateral alignment of ribs and grooves on the opposite sides of a double-rib belt. An accurately formed double-rib belt contributes to smooth system operation. Further, the belt life is lengthened over a corresponding belt with a "mis-pitch" condition.

In one form of the invention, an apparatus is provided for forming at least one of a rib and groove on a surface of a power transmission belt/belt sleeve. The apparatus has first and second supports on which the belt/belt sleeve can be mounted for movement in an endless path. First structure is provided on at least one of the first and second supports for reinforcing a belt/belt sleeve, mounted on the first and second supports, against movement and deformation of the belt/belt sleeve relative to the at least one of the first and second supports transversely to the endless path as the belt/belt sleeve moves in the endless path.

The invention further contemplates that structure for reinforcing the belt/belt sleeve against transverse movement and deformation may be provided on each of the first and second supports.

The at least one of the first and second supports includes a first shaft. The first structure includes a cartridge, with there being structure for mounting the cartridge to the first shaft so that the cartridge rotates about a first axis as a belt/belt sleeve mounted on the first and second supports moves in the endless path.

The structure for mounting the cartridge may include structure cooperating between the first shaft and cartridge for mounting the cartridge for movement relative to the shaft along the first axis.

The cartridge can be removable altogether to allow operation of the apparatus without the cartridge or substitution therefor of a cartridge having different characteristics to produce a different belt construction.

The invention further contemplates the above structure in combination with structure for forming at least one of a rib and groove on a surface of a power transmission belt/belt sleeve mounted on the first and second supports as the belt/belt sleeve moves in the endless path. The structure for forming the at least one of a rib and groove may be a rotating cutting/grinding element.

The rotating cutting/grinding element may be in the form of a cylindrical drum having a rotational axis and a peripheral surface, with there being at least one projecting cutting/grinding part and at least one recessed cutting/grinding part on the peripheral surface of the cutting/grinding element, with the parts spaced axially with respect to the rotational axis of the cutting/grinding element.

At least one of the first support, the second support, and the first structure is rotatable about one axis and the rotational axis of the cylindrical drum is parallel to the one axis and a) the at least one of the first support, second support, and the first structure and b) the cylindrical drum rotate in the same direction with the cylindrical drum operating and the belt/belt sleeve mounted on the first and second supports moving in the endless path. The cylindrical drum may also rotate oppositely to the direction of movement of the belt/belt sleeve.

In one form, the rotary cutting/grinding element is operated at a speed of 400 to 2000 rpm.

The invention further contemplates structure for driving at least one of the first support, the second support, and the first structure to cause movement of a belt/belt sleeve mounted on the first and second supports in the endless path. Preferably, the cartridge is driven on the apparatus.

The invention further contemplates the provision of structure for drawing material removed from the belt/belt sleeve by the cutting/grinding element, polishing powder, and any other discrete material adhered to the belt/belt sleeve, away from a belt/belt sleeve mounted on the first and second supports and moving in the endless path.

The drawing structure may include a source of vacuum.

The invention further contemplates the provision of structure for engaging a belt/belt sleeve mounted on the first and second supports for dislodging discrete material adhered to the a belt/belt sleeve. This structure may be in the form of a rotary element, such as a brush, which may be operated at speeds of 100 to 800 rpm and pressed against the moving belt/belt sleeve.

The brush may be pressed against the belt/belt sleeve with a pressure of 2–6 kg/cm.

The rotary brush has filaments that may be made from synthetic fiber or metallic wire.

The invention also contemplates the above structure in combination with a belt/belt sleeve having an inside surface, an outside surface, and laterally oppositely facing side surfaces. With the belt/belt sleeve mounted on the first and second supports in an operative position, one of the inside and outside belt/belt sleeve surfaces is exposed to be formed.

The invention further contemplates a method of forming at least one of a rib and groove on a surface of a power transmission belt/belt sleeve. The method includes the steps of: providing a belt/belt sleeve with an inside surface, an outside surface, and laterally oppositely facing side surfaces; providing first and second supports for the belt/belt sleeve; mounting the belt/belt sleeve on the first and second supports; reinforcing the belt/belt sleeve on one of the first and second supports so that the belt/belt sleeve is reinforced against movement and deformation relative to the one of the first and second supports laterally with respect to the belt/belt sleeve; advancing the belt/belt sleeve in an endless path around the first and second supports; and forming at least one of a rib and groove on one of the inside and outside surfaces of the belt/belt sleeve as the belt/belt sleeve is advanced.

The belt/belt sleeve may have at least one of a rib and groove on the other of the inside and outside surfaces and the step of reinforcing the belt/belt sleeve involves providing a cartridge on at least one of the first and second supports, with the cartridge having at least one of a complementary recess and projection, and meshing the at least one of the recess and projection on the cartridge with the one of the rib and groove on the other of the inside and outside surfaces.

The cartridge may be removably mounted in an operative position on the at least one of the first and second supports.

The forming step involves the step of rotating a cutting/grinding element and pressing the rotating/grinding element against the one of the inside and outside surfaces of the belt/belt sleeve.

In another form, the invention contemplates a method of forming at least one of a rib and groove on a surface of a power transmission belt/belt sleeve, which method includes of the steps of: providing a belt/belt sleeve having an inside surface, an outside surface, and laterally oppositely facing side surfaces; providing first and second supports for the belt/belt sleeve; mounting the belt/belt sleeve on the first and second supports so that one of the inside and outside belt surfaces is exposed to be formed; forming at least one of a rib and groove on the one of the inside and outside belt/belt sleeve surfaces; removing the belt/belt sleeve from the first and second supports; turning the belt/belt sleeve inside out; mounting the belt/belt sleeve on the first and second supports so that the other of the inside and outside surfaces is exposed to be formed; using the at least one of a rib and groove to reinforce the belt/belt sleeve on one of the first and second supports so that the belt/belt sleeve is reinforced against movement and deformation relative to the one of the first and second supports laterally with respect to the belt/belt sleeve; and forming at least one of a rib and groove on the other of the inside and outside belt/belt sleeve surfaces.

The step of using the at least one of a rib and groove to reinforce the belt/belt sleeve may involve the steps of providing a removable cartridge on the one of the first and second supports, which cartridge has a least one of a projection and recess that is complementary to the at least one of a rib and groove on the belt/belt sleeve, and meshing the at least one of a rib and groove on the belt/belt sleeve with the at least one of a projection and recess on the cartridge.

The step of forming at least one of a rib and groove on the other of the inside and outside belt/belt sleeve surfaces involves the step of using a rotary cylindrical cutting/grinding element. The cartridge may be adjusted relative to the one of the first and second supports to align the belt/belt sleeve in a desired position relative to the cylindrical cutting/grinding element.

The belt/belt sleeve may be placed under a predetermined tension before forming the at least one of a rib and groove on each of the inside and outside belt/belt sleeve surfaces.

The belt/belt sleeve may be advanced continuously as the at least one of a rib and groove is formed on each of the inside and outside belt/belt sleeve surfaces.

The step of forming the at least one of a rib and groove on the one of the inside and outside belt/belt sleeve surfaces may involve the step of using the rotating cylindrical cutting/grinding element to form the at least one of a rib and groove on the one of the inside and outside belt/belt sleeve surfaces.

The method may further include the step of continuously brushing at least one of the inside and outside belt/belt sleeve surfaces as the at least one of the inside and outside belt/belt sleeve surfaces is formed to thereby dislodge discrete material adhering to the belt/belt sleeve.

The method may further include the step of providing a source of suction to draw loose and dislodged material away from the belt/belt sleeve.

DETAILED DESCRIPTION OF THE DRAWINGS

Figure 1:
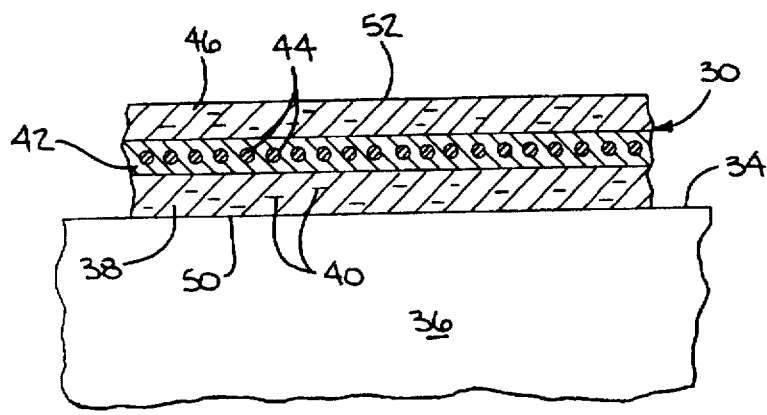
FIG. 1 is a fragmentary, cross-sectional view of an exemplary belt sleeve from which individual belts can be formed according to the present invention.

In FIG. 1, a belt sleeve is shown at 30. The belt sleeve 30 represents one suitable construction of a belt sleeve from which double-rib belts (two shown joined at 32 in FIG. 5), can be formed. A limitless number of different arrangements of components could be used to form the belt sleeve 30 in accordance with the present invention.

The belt sleeve 30 is defined by sequentially building up components on the peripheral surface 34 of a forming drum/mandrel 36. A bottom rubber layer 38 is initially placed against the drum 36. The rubber layer 38 contains cut fibers 40 of aramid, polyester, nylon, cotton, etc. The fibers 40 have a length of 1–10 mm and are present in an amount of 1 to 15 vol. percent. The fibers 40 are oriented so that the length thereof aligns with the width of the belt sleeve 30.

A cushion rubber layer 42 is placed over the bottom rubber layer 38. Longitudinally extending, load carrying cords 44 are embedded in the cushion rubber layer 42. The cords 44 are in a rope form and are wound in a spiral pattern around the drum 36.

A top rubber layer 46 is placed over the cushion rubber layer 42. The top rubber layer 46 preferably has the same composition and thickness as the bottom rubber layer 38.

The load carrying cords 44 are preferably located at a position midway between the inside belt sleeve surface 50, defined by the bottom rubber layer 38, and the outside surface 52 defined by the top rubber layer 46.

The various layers 38, 42, 46 are laminated together and the entire belt sleeve 30 vulcanized before formation thereof takes place. Individual belts 54 can then be cut from the belt sleeve 30.

Figure 5:
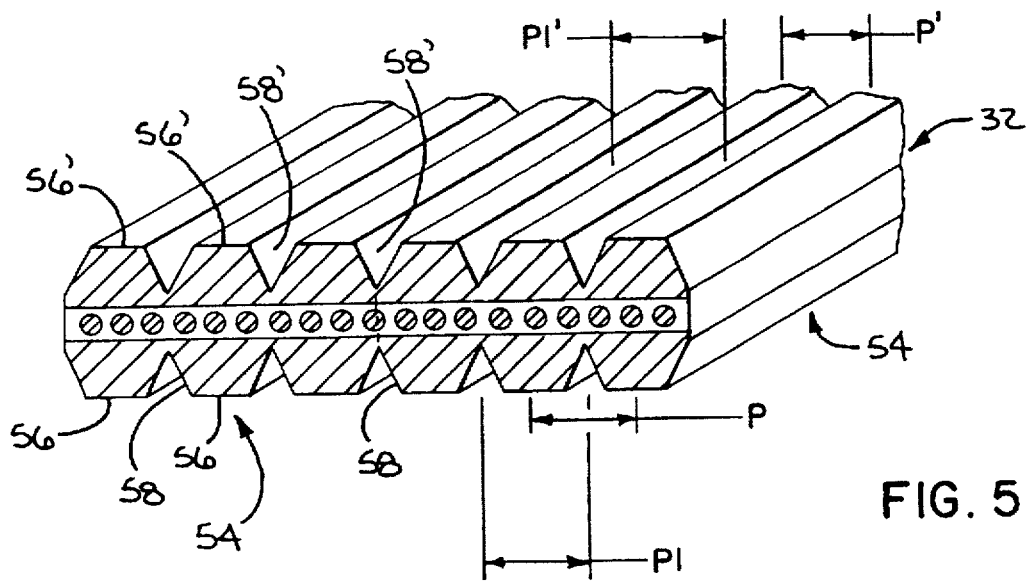
FIG. 5 is a fragmentary perspective view of a double-rib belt made according to the present invention and using the inventive apparatus.
Figure 6:
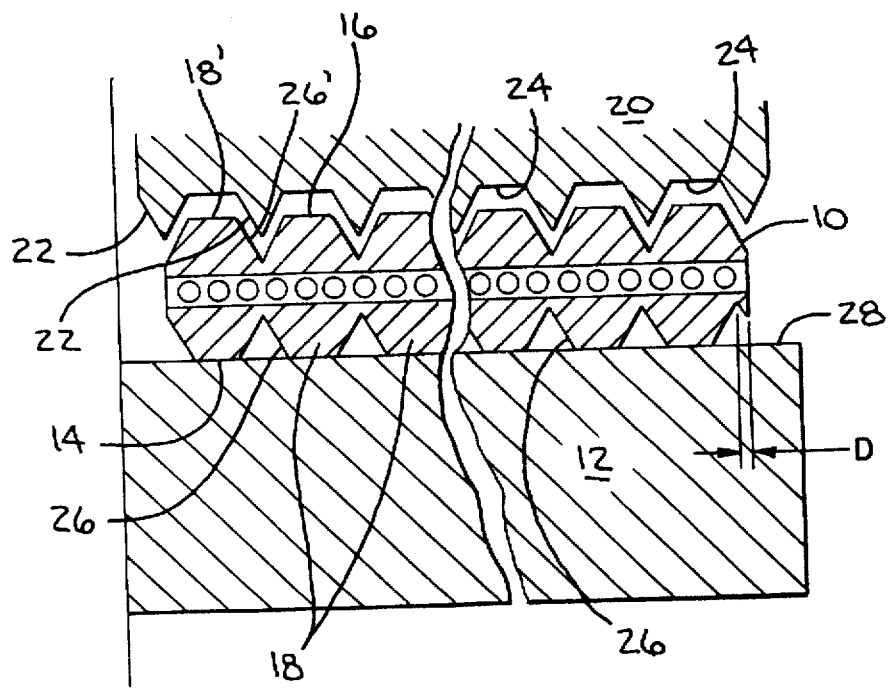
FIG. 6 is a view as in FIG. 4 showing a conventional support and cutting/grinding element.

As seen in FIG. 5, the belt sleeve 30 is formed to define laterally spaced inner ribs 56, with V-shaped grooves 58 therebetween, and laterally spaced outer ribs 56', with V-shaped grooves 58' therebetween. Ideally, the spacing/pitch (P) between the center lines of adjacent inner ribs 56 is equal to the pitch P' for the corresponding outer ribs 56'. Similarly, the spacing/pitch (P1) for the inner grooves 58 is ideally the same as the pitch P1' for the corresponding outer grooves 58'. One of the principal objectives of the present invention is to match the pitches P, P' and P1, P1' and to laterally align the ribs 56, 56' and grooves 58, 58' on the inside and outside of the belt sleeve 30.

Since either individual belts or a belt sleeve, from which a number of individual belts are cut, can be formed using the inventive concept, the description below will reference a "belt/belt sleeve" as the endless power transmission belt element being formed according to the invention.

Figure 2:
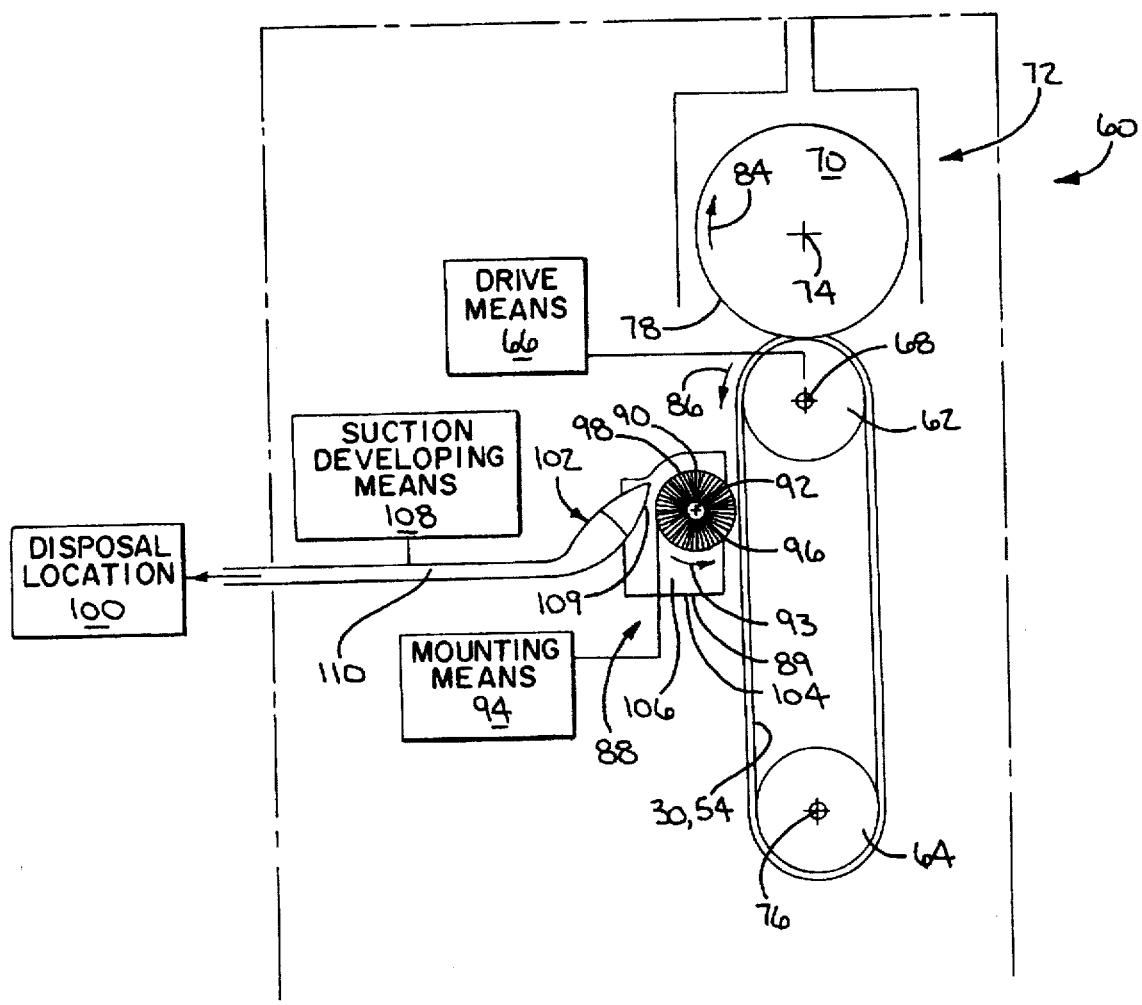
FIG. 2 is a schematic representation of an apparatus for forming at least one of a rib and groove on a belt sleeve supported operatively on the apparatus.
Figure 3:
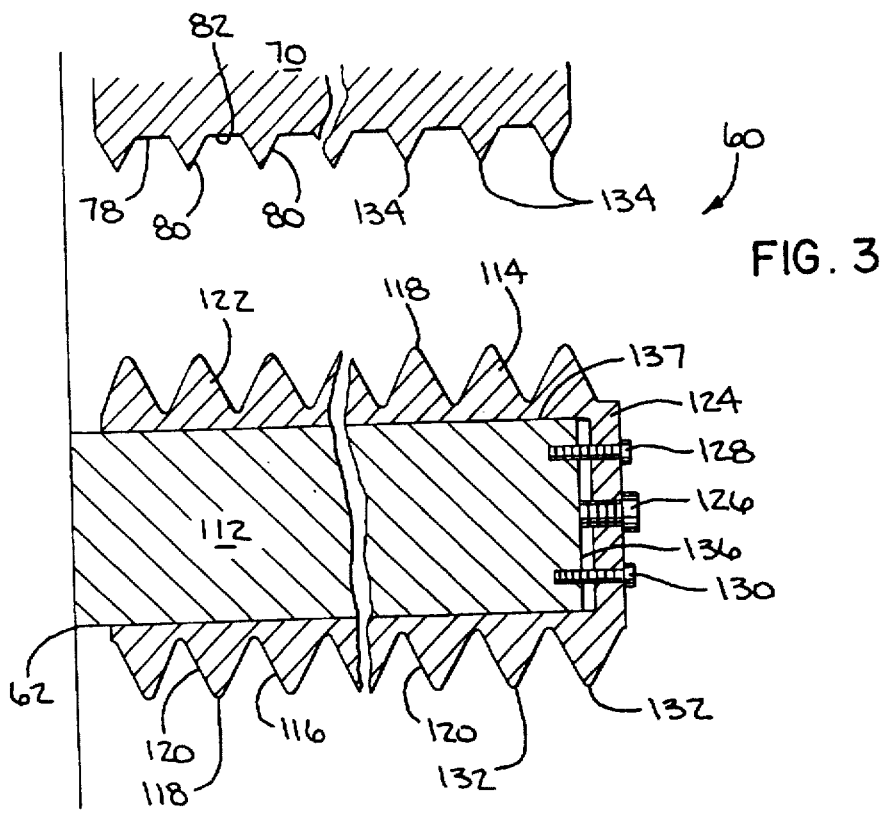
FIG. 3 is an enlarged, cross-sectional view of one support for the belt sleeve on the apparatus of FIG. 2 in relation to a cutting/grinding element for the belt sleeve.
Figure 4:
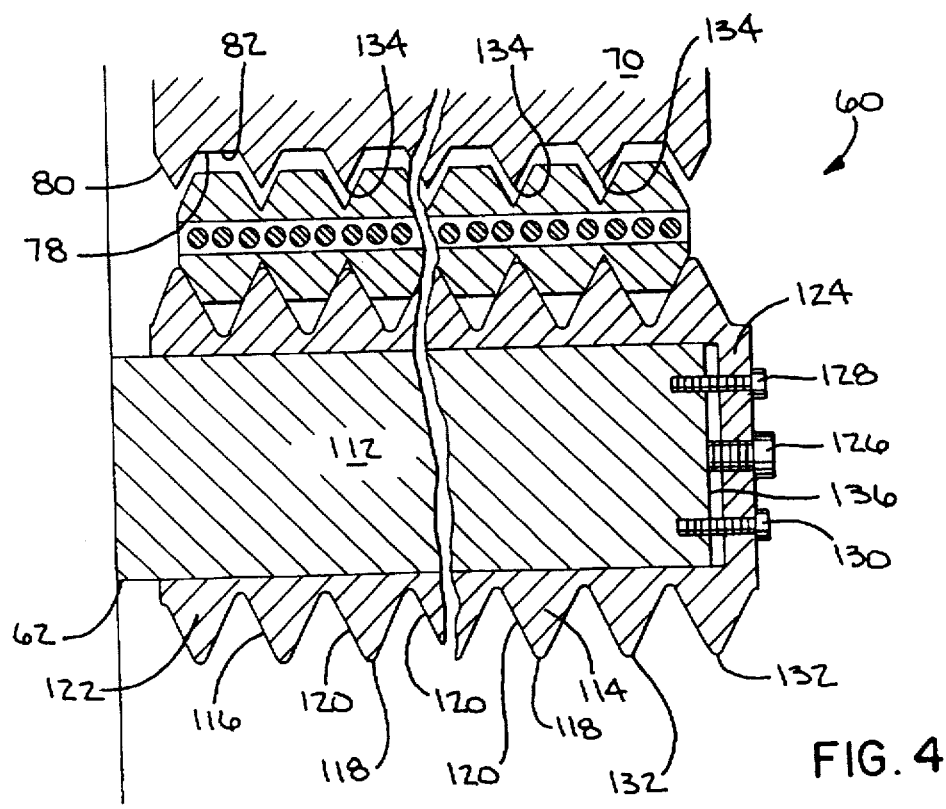
FIG. 4 is a view as in FIG. 3 with a belt sleeve, having one side thereof formed, in relation to a cutting/grinding element for cutting/forming the other side thereof.

The inventive apparatus for forming the belt/belt sleeve is shown at 60 in FIGS. 2–4. The belt/belt sleeve 30, 54 is trained around spaced first and second supports 62, 64 for movement in an endless path. At least one of the first and second supports 62, 64 is mounted to be movable towards the other of the first and second supports 62, 64 to facilitate mounting of the belt/belt sleeve 30, 54, and to permit setting of a desired tension thereon prior to formation. One or both of the supports 62, 64 can be driven to effect advancement of the belt/belt sleeve 30, 54. In FIG. 2, a drive means is shown schematically at 66 to effect rotation of the support 62 about an axis 68. The driving speed for the belt/belt sleeve 30, 54 can vary over a wide range.

With the belt/belt sleeve 30, 54 mounted on the supports 62, 64, the outer surface 52 of the rubber layer 46 exposed to be operated upon by a forming element 70 that is part of a grinding assembly at 72. The forming element 70 cuts and/or grinds the surface 52 and will hereafter be identified as a "cutting/grinding element". The cutting/grinding element 70 can be pressed against the belt/belt sleeve 30, 54 at the first, driven support 62 or, alternatively, could be pressed against the belt/belt sleeve 30, 54 at the driven support 64, in the event that only a single one of the supports 62, 64 is driven.

The cutting/grinding element 70 is in the forth of a cylindrical drum that is rotatable about an axis 74 that is parallel to the rotational axis 68 for the support 62 and the rotational axis 76 for the support 64. The cutting/grinding element 70 has a peripheral surface 78 with alternating cutting parts in the form of projections 80 and recesses 82, which are complementary to the ribs 56, 56' and grooves 58, 58' on the belt/belt sleeve 30, 54. The cutting/grinding element 70 can be configured to form from 3 to 100 laterally spaced ribs 56, 56' and grooves 58, 58'.

The cutting/grinding element 70 can be rotated in the same direction or oppositely to the direction of rotation of the belt/belt sleeve 30, 54 on the supports 62, 64. In the embodiment shown in FIG. 2, the cutting/grinding element 70 rotates in the direction of the arrow 84, i.e. clockwise, and the belt/belt sleeve 30, 54 rotates oppositely, in the direction of the arrow 86, i.e. counterclockwise. The cutting/grinding element 70 is preferably operated in the range of 400 to 2000 rpm.

One aspect of the invention is the provision of means at 88 for dislodging discrete foreign particles on the belt/belt sleeve 30, 54, such as those removed by the cutting/grinding element 70 as the forming step progresses. Additionally, polishing powder on the cutting/grinding element 70 tends to adhere to the belt/belt sleeve 30, 54. Polishing powder that is released from the cutting/grinding element 70 and not adhered to the belt/belt sleeve 30, 54 is sucked into a duct 89, formed around the cutting/grinding element 70, and is delivered to an appropriate disposal point away from the grinding assembly 72.

The means at 88 includes a rotary brush 90 to dislodge adhered polishing powder and ground belt/belt sleeve particles adhering to the belt/belt sleeve 30, 54. The brush 90 has a rotational axis 92 that is parallel to the axes 68, 76 on the supports 62, 64. The brush 90 preferably rotates in the direction of the arrow 93, i.e. counterclockwise and opposite to the direction of advancement of the belt/belt sleeve 30, 54 on the supports 62, 64. The brush 90 continuously contacts the belt/belt sleeve 30, 54 during the forming process. The brush 90 is preferably rotated at a speed of 100 to 800 rpm and is pressed against the belt/belt sleeve 30, 54 with a pressure in a range of 2 to 6 kg/cm (linear pressure). To keep the pressure of the brush 90 constant as the belt/belt sleeve forming operation proceeds, the brush 90 is mounted by a means 94 for movement progressively towards the moving belt/belt sleeve 30, 54 as it is formed by the cutting/grinding element 70.

The brush 90 has a central shaft 96 with radially projecting filaments 98. The filaments 98 may be a synthetic fiber, such as nylon or polyester, or metallic wire, such as brass, or the like.

Once the brush 90 breaks loose adhered particles on the belt/belt sleeve 30, 54, the particles are drawn by vacuum away from the belt/belt sleeve 30, 54 and delivered to a disposal location 100.

The means 88 includes a vacuum unit 102 that develops suction within a shroud 104 defining an internal space 106 in which the brush 90 is partially contained. A suction developing means 108 evacuates the end 109 of a conduit 110 adjacent to the brush 90. The discharged particles move through the conduit 110 and are delivered to the disposal location 100. Additional suction conduits 110 can be employed if desired.

The support 62 has a central shaft 112 to which a cylindrical cartridge 114 is mounted. The cartridge 114 has a peripheral surface 116 which has at least one, and preferably a plurality of, annular projections 118 and recesses 120 alternating along the axial extent of the cartridge 114 and complementary to the ribs 56, 56' and grooves 58, 58' on the belt/belt sleeve 30, 54.

The cartridge has a cylindrical body 122 which surrounds the shaft 112 and a flat base 124 which receives a set screw 126 and locking bolts 128, 130. Through the above arrangement, the cartridge 114 can be adjusted to align the centers of the recesses 120 on the cartridge with the recesses 82 in the cutting/grinding element 70. This similarly aligns the apexes 132 of the projections 118 on the cartridge 114 with the apexes 134 of the projections 80 on the cutting/grinding element 70.

The set screw 126 can be adjusted so that it abuts to the free end 136 of the shaft 112 with the cartridge 114 in the desired location. The bolts 128, 130 can then be tightened to maintain this position.

The cartridge 114 is preferably made of a synthetic resin or metal. Several different cartridges 114, having different shapes, or spacing of projections 118 and recesses 120, can be kept on hand to allow interchange depending upon the type of belt that is to be formed. The cartridge 114 can be conveniently removed by loosening and removing the locking bolts 128, 130.

Initially, one of the inside and outside surfaces 50, 52 is formed using the cutting/grinding element 70. The cutting/grinding element 70 is then backed away to allow removal of the belt/belt sleeve 30, 54. The belt/belt sleeve 30, 54 is then turned inside out and re-mounted on the supports 62, 64. The already formed ribs 56, 56' and grooves 58, 58' on the one surface of the belt/belt sleeve 30, 54 are meshed with the recesses 120 and projections 118 on the cartridge 114. The projections 118 give lateral rigidity to the belt/belt sleeve 30, 54 and prevent lateral shifting thereof.

The belt/belt sleeve 30, 54 can then be driven and the cutting/grinding element 70 pressed thereagainst to form the ribs 56, 56' and grooves 58, 58' on the other of the inside and outside belt/belt sleeve surfaces 50, 52.

The belt/belt sleeve 30, 54 is pretensioned before forming each of the inside and outside surfaces. The means 88 is operated during the subsequent forming step to remove the polishing powder and dislodge other loose particles on the belt/belt sleeve.

The belt 54, cut from the belt sleeve 30, has matched pitches for the ribs 56, 56'and grooves 58, 58' on opposite sides of the belt 54. The previously discussed problem of lateral discrepancy is minimized or altogether eliminated.

It should be understood that it is not necessary to mesh all of the ribs 56, 56' and grooves 58, 58' with the projections 118 and recesses 120 on the cartridge 114. For example, this meshing may be limited to one or more projections 118 and recesses 120 at the ends of the cartridge 114. In that case, the center portion of the cartridge 114 can be made as a flat, recessed zone to abut to one of the inside and outside belt surfaces 50, 52.

Once the belt sleeve 30 is formed, it can be cut to provide individual double-rib belts 54 of appropriate width. Three ribs 56, 56' are shown for each belt 54.

A double-rib belt 54 made according to the present invention was tested to determine the discrepancy (D) of the pitch of the grooves 58, 58' on the inside and outside of a double-ribbed belt. The results are described below.

The belt sleeve 30 consisted of a bottom rubber layer 38 made of chloroprene rubber and having a thickness of 3.35 mm. Nylon fibers 40 cut to a 6 mm length, were dispersed in the rubber at 8 vol. percent. Aramid fibers 40, cut to a 3 mm length, were dispersed in the rubber at 3 vol. percent. All of the fibers 40 were oriented in the widthwise direction of the belt sleeve 30. A cushion rubber layer 42 was likewise made of chloroprene rubber. The load carrying cords 44 were made from a polyester fiber rope. The top rubber layer 48 was made with the same thickness, with the same composition, and with the same fiber volume and type as the bottom rubber layer 38.

The belt sleeve 30, as described above, was mounted on the supports 62, 64 and pre-tensioned. The cartridge 114 was removed before mounting so that the belt sleeve 30 was supported directly on the flat outer surface 137 of the shaft 112. The cutting/grinding element 70, with diamond abrasive on the peripheral surface 78 thereof, was rotated oppositely to the direction of belt sleeve advance at a speed of 1,800 rpm and pressed against the belt sleeve 30 to define the ribs 56, 56' and grooves 58, 58' on one surface.

Once the belt sleeve 30 was removed from the support 62, 62, it was turned inside out. The cylindrical cartridge 114 was then placed on the shaft 112. The cartridge 114 was adjusted and the belt sleeve 30 remounted on the supports 62, 64 to mesh the ribs 56, 56' and grooves 58, 58' with the projections 118 and recesses 120 on the cartridge 114. The cutting/grinding element 70 was then pressed against the belt sleeve 32 to define the ribs 56, 56' and grooves 58, 58' on the other of the inside and outside surfaces 50, 52 of the belt sleeve 30.

The formed belt sleeve 30 was then removed from the supports 62, 64 and trained around another set of supports and cut to obtain double-rib belts, each having three ribs.

The average for six measured pitches on the grooves 58, 58' on one face was 3.57 mm, while the same average on the other side was 3.57 mm. Thus the discrepancy (D) for the pitch was 0.1 mm.

This small discrepancy (D) is attributable to the lateral stability of the belt/belt sleeve 30, 54, which does not significantly deform under the thrust induced by the cutting/grinding element 70.

For comparison purposes, a double-rib belt, made in the same manner on the same type of apparatus, without the cartridge 114, had an average pitch of the grooves 58, 58' for six pitches as 3.58 mm on one side and 3.57 mm on the other side. The discrepancy (D) of pitch was more than 0.8 min.

To test the above belts in operation, each belt was mounted on a drive pulley having a diameter of 140 mm, using a tensioning pulley having a diameter of 60 mm under a tension of 50 kgf/3 ribs. The span between the drive and driven pulley was 30 mm. The belts were advanced while keeping a ribbed driven pulley, with a diameter of 110 mm, in contact with the back face of the belts at two different speeds—7.96 meters per second and 14.33 meters per second, at room temperature. The occurrence of "belt jumping" was checked.

The belt made by the conventional method (with the pitch discrepancy (D) of 0.8 mm) jumped one rib at a travel speed of 14.3 meters per second. However, the belt made according to the present invention did not jump at all.

The foregoing disclosure of specific embodiments is intended to be illustrative of the broad concepts comprehended by the invention.

We claim:

1. An apparatus for forming at least one of a rib and groove on one surface of an endless power transmission belt element having at least one of a rib and a groove on another surface, said apparatus comprising:

first and second spaced supports rotatable around first and second substantially parallel axes on which an endless power transmission belt element can be mounted for movement around both the first and second supports in an endless path, at least one of said first and second spaced supports being selectively movable relative to the other of the first and second spaced supports for providing a selected tension on an endless power transmission belt element mounted for movement around both supports;

first means on the first support for reinforcing an endless power transmission belt element mounted on the first and second supports against movement and deformation of an endless power transmission belt element relative to the first support transversely to the endless path as an endless power transmission belt element moves in the endless path;

second means on the second support for reinforcing an endless power transmission belt element mounted on the first and second supports against movement and deformation of an endless power transmission belt element relative to the second support transversely to the endless path as an endless power transmission belt element moves in the endless path; and means for forming at least one of the one rib and groove on a surface of an endless power transmission belt element as an endless power transmission belt element mounted on and extending continuously around the spaced first and second supports moves in the endless path, at least one of the first and second means comprising means for selectively shifting the endless path parallel to the first and second axes on at least one of the first and second supports.

2. An apparatus for supporting an endless power transmission belt element to facilitate formation thereof, said apparatus comprising:

first and second supports on which an endless power transmission belt element can be mounted for movement in an endless path; and first means on at least one of the first and second supports for reinforcing an endless power transmission belt element mounted on the first and second supports against movement and deformation of the endless power transmission belt element relative to the at least one of the first and second supports transversely to the endless path as an endless power transmission belt element moves in the endless path, wherein the at least one of the first and second supports includes a first shaft and the first means comprises a cartridge, with there being means for mounting the cartridge to the first shaft so that the cartridge rotates about a first axis as an endless power transmission belt element mounted on the first and second supports moves in the endless path.

3. The apparatus for supporting an endless power transmission belt element to facilitate formation thereof according to claim 2 wherein the means for mounting the cartridge comprises means for mounting the cartridge for movement selectively along the first axis.

4. The apparatus for supporting an endless power transmission belt element to facilitate formation thereof according to claim 2 wherein the means for mounting the cartridge comprises means cooperating between the first shaft and cartridge for mounting the cartridge for movement relative to the first shaft along the first axis.

5. The apparatus for supporting an endless power transmission belt element to facilitate formation thereof according to claim 2 wherein the means for mounting the cartridge comprises means cooperating between the first shaft and cartridge for removably mounting the cartridge to the first shaft.

6. The apparatus for forming at least one of a rib and groove on a surface of an endless power transmission belt element according to claim 1 wherein the means for forming at least one of a rib and groove comprises a rotating forming element.

7. The apparatus for forming at least one of a rib and groove on a surface of an endless power transmission belt element according to claim 1 in combination with an endless power transmission belt element having an inside surface, an outside surface and laterally oppositely facing side surfaces and with the endless power transmission belt element mounted on the first and second supports in an operative position wherein the endless power transmission belt element is trained around both the first and second supports, one of the inside and outside endless power transmission belt element surfaces is exposed to be operated on by the forming means as the endless power transmission belt element moves in the endless path.

8. The apparatus for forming at least one of a rib and groove on a surface of an endless power transmission belt element according to claim 6 wherein the rotating forming element is in the form of a cylindrical drum having a rotational axis and a peripheral surface and there is at least one projecting part and at least one recessed part on the peripheral surface of the forming element spaced from each other axially with respect to the rotational axis of the forming element.

9. The apparatus for forming at least one of a rib and groove on a surface of an endless power transmission belt element according to claim 1 including means for driving at least one of the first support, the second support and the first means to cause movement of an endless power transmission belt element mounted on the first and second supports in the endless path.

10. The apparatus for forming at least one of a rib and groove on a surface of an endless power transmission belt element according to claim 8 wherein at least one of the first support, the second support and the first means is rotatable about one axis and the rotational axis of the cylindrical drum is parallel to the one axis and a) the at least one of the first support, the second support and the first means and b) the cylindrical drum rotate in the same direction with the cylindrical drum operating and an endless power transmission belt element mounted on the first and second supports moving in the endless path.

11. The apparatus for forming at least one of a rib and groove on a surface of an endless power transmission belt element according to claim 8 wherein at least one of the first support, the second support and the first means is rotatable about one axis and the rotational axis of the cylindrical drum is parallel to the one axis and a) the at least one of the first support, the second support and the first means and b) the cylindrical drum rotate in opposite directions with the cylindrical drum operating and an endless power transmission belt element mounted on the first and second supports moving in the endless path.

12. The apparatus for forming at least one of a rib and groove on a surface of an endless power transmission belt element according to claim 6 wherein the means for forming at least one of a rib and groove includes means for rotating the rotating forming element at a speed of 400 to 2000 rpm.

13. The apparatus for forming at least one of a rib and groove on a surface of an endless power transmission belt element according to claim 1 including means for drawing foreign material on an endless power transmission belt element away from an endless power transmission belt element mounted on the first and second supports and moving in the endless path.

14. The apparatus for forming at least one of a rib and groove on a surface of an endless power transmission belt element according to claim 13 wherein the drawing means comprises vacuum means.

15. An apparatus for forming at least one of a rib and groove on a surface of an endless power transmission belt element, said apparatus comprising:

first and second supports on which an endless power transmission belt element can be mounted for movement in an endless path;

first means on at least one of the first and second supports for reinforcing an endless power transmission belt element mounted on the first and second supports against movement and deformation of an endless power transmission belt element relative to the at least one of the first and second supports transversely to the endless path as an endless power transmission belt element moves in the endless path;

means for forming an endless power transmission belt element mounted on the first and second supports and moving in the endless path; and means for engaging an endless power transmission belt element mounted on the first and second supports for dislodging foreign material adhered to an endless power transmission belt element mounted on the first and second supports and moving in the endless path.

16. The apparatus for forming at least one of a rib and groove on a surface of an endless power transmission belt element according to claim 15 wherein the means for engaging an endless power transmission belt element and dislodging material comprises a rotary brush.

17. The apparatus for forming at least one of a rib and groove on a surface of an endless power transmission belt element according to claim 16 wherein the means for engaging an endless power transmission belt element and dislodging material includes means for rotating the rotary brush at a speed of 100 to 800 rpm.

18. The apparatus for forming at least one of a rib and groove on a surface of an endless power transmission belt element according to claim 16 wherein the means for engaging an endless power transmission belt element and dislodging material includes means for mounting the rotary brush to a support so that the brush applies a pressure of 2 to 6 kg/cm to an endless power transmission belt element mounted on the first and second supports.

19. The apparatus for forming at least one of a rib and groove on a surface of an endless power transmission belt element according to claim 16 wherein the rotary brush has filaments made of at least one of synthetic fibers and metallic wire.

20. The apparatus for supporting an endless power transmission belt element to facilitate formation thereof according to claim 3 wherein the cartridge has a base that extends radially with respect to the first axis and the means for mounting the cartridge for movement comprises means cooperating between the base of the cartridge and the first shaft.

21. The apparatus for supporting power transmission belt element to facilitate formation thereof according to claim 20 wherein the cartridge has a cup-shaped configuration, the first shaft has a free end and the base of the cartridge is spaced axially with respect to the first axis from the free end of the first shaft.

* * * * *